Nov. 22, 1955

R. B. LEACHMAN 2,724,826

RANGE UNIT

Filed Nov. 19, 1945

INVENTOR
ROBERT B. LEACHMAN

BY Ralph L Chappell
ATTORNEY

United States Patent Office 2,724,826
Patented Nov. 22, 1955

2,724,826

RANGE UNIT

Robert B. Leachman, Cambridge, Mass., assignor, by mesne assignments, to the United States of America as represented by the Secretary of the Navy Application November 19, 1945, Serial No. 629,672

7 Claims. (Cl. 343—13)

This invention relates to range units, more particularly those for controlling and indicating the position of a tracking pulse for measuring range in a radar object detection system.

Radar systems set up on rigid accuracy specifications commonly make use of a tracking pulse for measuring the range of a target. This pulse must be of short time duration, and must be continuously variable in time position within the specified limits of measurement of the radar system. The actual range measurement is accomplished by making the tracking pulse and the target echo coincident in time, and noting from associated calibrated equipment, the range position of the tracking pulse. The principal limitation in the accuracy of the range measurement lies in the determination of the time position of the tracking pulse.

Two of the numerous methods devised to control and indicate the position of the tracking pulse will be described briefly at this point and at greater detail in connection with their adaptation in the present invention. In the method known in the art as sine-wave tracking, a train of sinusoidal oscillations is initiated with each transmitted pulse. Selected points, normally the zero voltage points (voltage nodes) of these oscillations constitute a series of accurate range marks. The range measurement is made continuously variable by shifting the phase of the oscillations with a phase shifting condenser. By means of an electrical feedback loop, the tracking pulse is made to lock in time coincidence with a particular voltage node of the oscillations. The phase shift necessary to make the marker coincide with the echo is then a measure of the range. This measurement is accurate, but is subject to errors due to locking in on the wrong node of the sine wave. For instance, calibration is lost without warning when power fails or the unit is subjected to mechanical shock or electrical disturbances.

One alternate method for controlling and indicating the position of the tracking pulse is by use of a voltage sensitive delay network. Circuits producing a linear sweep, multivibrators, or phantastrons (voltage sensitive delay networks producing a voltage wave varying linearly with time) may be used to generate the time delay. The tracking pulse is generated at the end of this delay, and range is indicated by the position of the range potentiometer which governs the time of the delay. This indication is more dependable, but less precise, than that obtained by the phase shift method. Principal errors are due to non-linearity of the range potentiometer and the voltage versus delay non-linearity in the range-delay circuit itself.

It is the object of the present invention to provide a range measuring circuit which will combine the advantages and eliminate the disadvantages of both the foregoing methods.

Differently expressed, an object of the present invention is to provide a circuit which will control and indicate the position of a tracking pulse, said circuit being a combination of two methods, one method servng to correct for non-linearities in the other method.

It is a further object of the invention to provide a circuit in which sine-wave tracking is utilized to correct for non-linearities in a voltage sensitive delay circuit.

Another object of the present invention is to provide a tracking monitor which will indicate and/or correct an excessive tracking error.

These and other objects will be more apparent upon consideration of the following specification, taken in connection with the accompanying drawings, forming a part thereof, in which.

Figure 1:
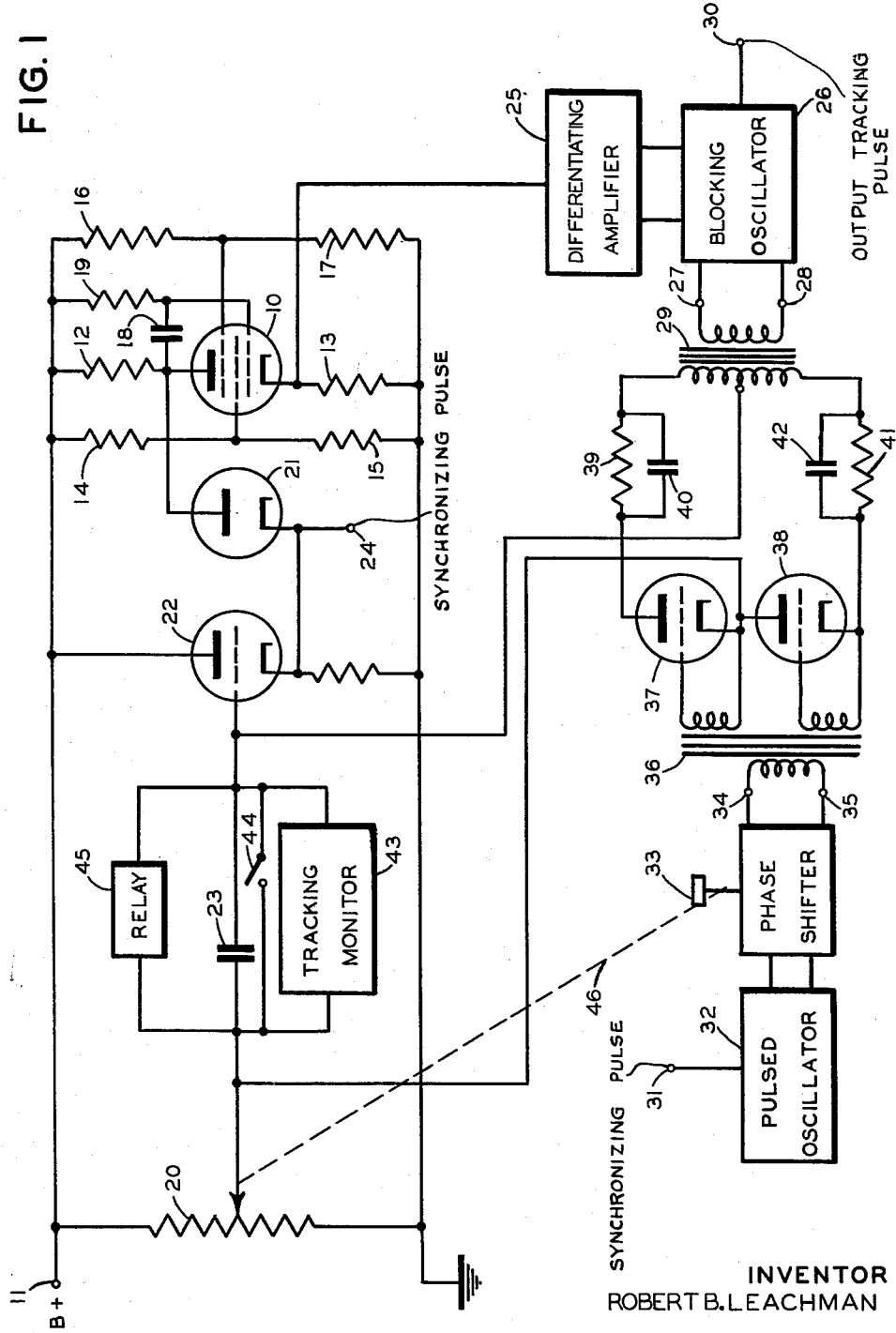
Fig. 1 is a schematic circuit diagram of the invention.

Referring to the drawings, a variable voltage, herein represented by potentiometer 20, controls the width of a delay gate generated by phantastron 10. Blocking oscillator 26 is fired at a time coincident with the end of this delay gate, producing a tracking pulse to follow the target echo. Sine waves, shifted in phase to the extent determined by the range of the target echo, are coupled to detector tubes 37 and 38. The tracking pulse is also coupled into this circuit. Lack of time coincidence between this tracking pulse and a range-determined voltage node of the sine waves results in an error voltage across condenser 23, the polarity of this voltage being such that it adds algebraically to the potentiometer voltage to correct the width of the phantastron gate and bring the tracking pulse and the voltage node into time coincidence. This locks the tracking pulse to the more precise method. Lack of proper tracking is reflected in an excessive error voltage across condenser 23. This voltage serves as a monitor for the operation of the system.

Referring to the particular embodiment here illustrated, a pentode tube 10 having the customary cathode, grid, screen, suppressor and plate, has these elements connected as a phantastron circuit. Though any known type of voltage sensitive delay gate circuit may be herein incorporated, the phantastron will be described relative to its function in the operation of the invention. A source of potential has its positive side connected to terminal 11 and its negative side connected to ground. Plate resistor 12 connects the positive side of this source with the plate of tube 10, while cathode resistor 13 connects the negative side of this source with the cathode of tube 10. A voltage divider, comprising resistors 14 and 15 maintains the screen at a positive potential. A second voltage divider, comprising resistors 16 and 17, maintains the suppressor at a potential slightly positive with respect to ground. A condenser 18 joins the plate and grid of tube 10, the grid being connected through resistor 19 to the positive side of the potential source. A potentiometer 20, known as the range potentiometer, is connected across the potential source. The plate of tube 10 is connected through diode 21, cathode follower tube 22, and condenser 23, to the movable arm of potentiometer 20.

Figure 2:
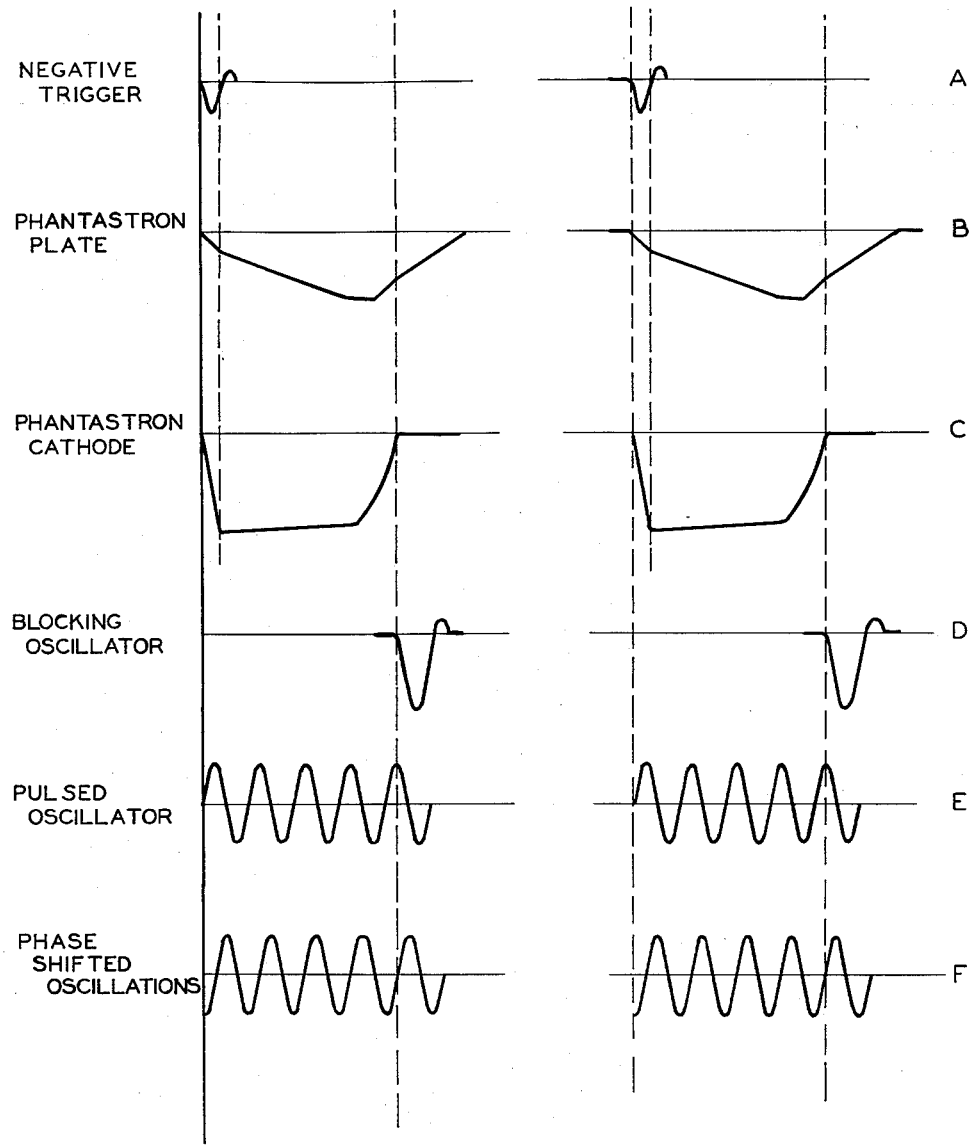
Fig. 2 is a representation of wave forms of voltage at specified points in the circuit of Fig. 1.

In the quiescent state, the only current flow is screen current, the suppressor being negative with respect to the cathode to prevent plate current flow. A negative voltage pulse synchronized with the radar transmitter modulator pulse, see A of Fig. 2, is applied at terminal 24 through diode 21 to the plate of tube 10. This drop in plate voltage is fed back to the grid through condenser 18, the drop in grid voltage causing the screen current to decrease. This results in a drop in cathode potential to a point where the suppressor is positive with respect to the cathode, and plate current flow begins. Condenser 18 discharges through resistor 19, causing the grid to become slowly more positive. While the plate voltage decreases linearly after its initial drop, and feedback ot this falling voltage through condenser 18 maintains the discharge rate of condenser 18 constant. The plate voltage will fall linearly until saturation is reached (there is no further tendency for plate current to increase due to decreasing grid bias). Regeneration ends and the grid voltage then rises through resistor 19 and the cathode follows it until the suppressor is negative with respect to the cathode, and plate current is cut off. Plate voltage returns to its initial value and the cycle is complete. Voltage wave forms at the plate and cathode are represented as B and C of Fig. 2.

Because the potential of the grid at the time of recovery is constant, the length of the phantastron output pulse can be governed by the charge on condenser 18. This is done by controlling the initial plate potential with range potentiometer 20. The output is taken off the cathode of tube 10, is differentiated and amplified in differentiating amplifier 25, and its output pulse trigger coincident with the end of the delay gate from the phantastron is used to fire blocking oscillator 26. The output pulse of blocking oscillator 26, see D of Fig. 2, is applied across terminals 27 and 28 of the primary of transformer 29. The output tracking pulse is taken off terminal 30.

The negative voltage pulse synchronized with the transmitted pulse and applied at terminal 31 initiates a train of sinusoidal oscillations in pulsed oscillator 32 (see E of Fig. 2). Any oscillator capable of producing a wave train which may be turned on and off by a gate will suffice. It is preferable that the oscillations be undamped.

The sine waves are applied to phase shifter 33. The method commonly used to shift the phase of the pulsed oscillations consists of splitting the original oscillations into four separate phases 90° apart by means of a resistance capacitance bridge and recombining these in proper proportion in a capacity mixer to give a resultant which is continuously variable in phase. Range potentiometer 20 and phase shifter 33 are geared together as schematically indicated by broken line 46 so that the time sequence of voltage wave forms is as shown in Fig. 2. The phased output, see F of Fig. 2, is applied across terminals 34 and 35 of the primary of transformer 36.

It is the function of sine wave tracking as incorporated in the present invention to generate an error voltage which can be used to correct for errors due to non-linearity in the range potentiometer and the range-delay gate circuit (phantastron as herein used). In order that this error voltage can be added directly to the range potentiometer voltage, it is desirable that the circuit producing this error voltage float at the range potentiometer direct voltage level. This is accomplished by inductively coupling the sine-wave oscillations and the tracking pulse into the detector circuit which produces the error voltage.

The terminals of one of the dual-secondary windings of transformer 36 are connected to the grid and cathode of tube 37, the terminals of the other dual-secondary winding are connected to the grid and cathode of tube 38, these connections being made in such a manner that the sine waves applied across the two tubes are 180° out of phase. The plate of tube 37 is connected through a self-bias circuit comprising resistor 39 and condenser 40 to one side of the secondary winding of transformer 29. The cathode of tube 38 is connected through a self-bias circuit comprising resistor 41 and condenser 42 to the other side of the secondary winding of transformer 29. The cathode of tube 37 and the plate of tube 38 are commonly connected to one side of condenser 23, and the center-tap of transformer 29 is connected to the other side of condenser 23. The firing of blocking oscillator 26 produces a positive pulse of voltage at the plate of tube 37 and a negative pulse of voltage at the cathode of tube 38. If the sine wave applied to the grids of tubes 37 and 38 is at its zero voltage point at a time coincident with the firing of blocking oscillator 26, tubes 37 and 38 will conduct equally and there will be no error voltage built up across output condenser 23. Should the tracking pulse occur at a time other than the time when the sine wave applied to the grids of tubes 37 and 38 is at its voltage node, one of the tubes will conduct more heavily than the other, and an error voltage will be produced across output condenser 23 of such polarity that it will correct the width of the range delay gate from phantastron tube 10 and bring the tracking pulse into coincidence with the voltage node of the sine wave. Cathode follower tube 22 prevents loading of the range potentiometer 20 or the detector output condenser 23.

Circuit constants must be such that the maximum inherent error in the uncorrected voltage sensitive delay system must be less than half the period of the sine wave oscillations. In other words, for the system to track on the correct voltage node, the error voltage produced across condenser 23 must be smaller in absolute magnitude than the increment in voltage required to change the width of the delay gate from phantastron tube 10 by half the period of the sine wave oscillations.

A bulb that will glow when the error voltage becomes larger than said increment serves as tracking monitor 43. Closing correcting switch 44 brings the tracking pulse to the correct cycle and corrects the system. Automatic correcting is accomplished by relay 45, which closes when the error voltage across condenser 23 reaches a predetermined limit and shorts out this error voltage.

The invention is only to be limited by the appended claims.

What is claimed is:

1. A range measuring unit for a radar object detection system comprising, a source of timing signals, a circuit responsive to a signal from said source to produce an output voltage pulse delayed in time after said signal by a time interval controllable in accordance with the amplitude of an adjustable applied voltage, a sine wave generator adapted to operate under the control of signals from said source, a phase shifter adapted to adjust the time of occurrence of selected voltage points of said sine wave, a detector energized by said voltage pulse and responsive to said phase shifted sine wave to derive a control voltage having an amplitude and polarity in accordance with the difference in time of occurrence of said pulse with respect to a predetermined voltage point of said phase shifted sine wave, and means to apply said control voltage to said circuit to adjust said time interval, whereby said pulse is brought into time coincidence with said selected voltage point of said phase shifted sine wave.

2. A range measuring unit for a radar object detection system comprising, a source of timing signals, a circuit responsive to a signal from said source to produce an output voltage wave having a time duration controllable in accordance with the amplitude of an adjustable applied voltage, means for producing a voltage pulse at the termination of said voltage wave, a sine wave generator adapted to operate under the control of signals from said source, means to shift the phase of said sine waves, a detector energized by said voltage pulse and responsive to said phase shifted sine wave to derive a control voltage having an amplitude and polarity in accordance with the difference in time of occurrence of said pulse with respect to a predetermined voltage point of said phase shifted sine wave, and means to apply said control voltage to said circuit to adjust the time duration of said voltage wave, and whereby said voltage pulse is brought into time coincidence with said selected voltage point of said phase shifted sine wave.

3. The combination of claim 2 in which an indicator is connected across said detector output to display the occurrence of excessive amplitude of said control voltage and a relay shunting said indicator for shorting out said control voltage in the event said control voltage exceeds a predetermined limit.

4. A range measuring unit for a radar object detection system comprising, a source of timing signals, a circuit responsive to a signal from said source to produce an output voltage wave having a time duration controllable in accordance with the amplitude of an adjustable voltage, a source of voltage, a potentiometer energized from said source and adapted to provide a voltage adjustable in accordance with the position of the movable arm thereof, a condenser, a cathode follower electron tube circuit and a diode serially connecting the movable arm of said potentiometer with said circuit to adjust the time duration of said voltage wave, a differentiating and amplifying circuit for producing a voltage pulse at the termination of said voltage wave, a blocking oscillator, connecting leads applying said voltage pulse to said blocking oscillator to produce an output range tracking pulse, a generator for producing sinusoidal oscillations under the control of signals from said source, a phase shifter for adjusting the phase of said oscillations, a detecting circuit for deriving a voltage output having amplitude and polarity in accordance with the difference in time of occurrence of said tracking pulse and a preselected voltage point of said phase shifted sine wave, said tracking pulse and said phase shifted sine wave being inductively coupled into said detecting circuit, said condenser being connected across said detecting circuit output, whereby the voltage developed across said condenser is added algebraically to the voltage at the movable arm of said potentiometer to correct the time duration of said voltage wave and the time of occurrence of said tracking pulse.

5. The combination of claim 4 in which an indicator and a relay are connected across said condenser, said indicator operating to show excessive amplitude of said detector voltage output and said relay acting to short out said output voltage of said detecting circuit in the event said output voltage exceeds a predetermined limit, thereby restoring the time duration of said voltage wave to produce time coincidence between said tracking pulse and the selected voltage point of the correct sine wave cycle.

6. A range measuring unit for a radar object detection system comprising, a source of timing signals, a phantastron circuit for producing a variable time duration voltage wave in response to a signal from said source, a potential source, a potentiometer connected across said potential source to provide a variable amplitude voltage, a condenser, a cathode follower electron tube circuit, and a diode serially connecting said potentiometer and said phantastron circuit, a differentiating and amplifying circuit for producing a voltage pulse at the termination of said voltage wave, a blocking oscillator to produce a tracking pulse in response to said voltage pulse at the termination of said voltage wave, a generator for producing a train of sine oscillations under the control of signals from said source, a phase shifter for adjusting the phase of said sine waves to control the time of occurrence of a selected zero voltage point of said sine wave, a detecting circuit for producing a voltage output having amplitude and polarity in accordance with the difference in time of occurrence of said tracking pulse and said selected voltage point of said phase shifted sine wave, said tracking pulse and said sine waves being inductively coupled into said detecting circuit, the output voltage of said detector being developed across said condenser and added algebraically to the voltage from said potentiometer to correct the time duration of said voltage wave to effect time coincidence of said tracking pulse and said selected zero voltage point, an indicator for indicating the time of occurrence of said tracking pulse, an indicator connected across said condenser to show deviation from said time coincidence, and a relay for shorting out said output voltage of said detecting circuit in the event said output voltage exceeds a predetermined limit thereby restoring the time duration of said phantastron circuit output voltage wave to time coincidence with the zero voltage point of the correct sine wave cycle.

7. The combination of claim 6 in which the adjustment of said phase shifter is mechanically connected to the adjustment of said potentiometer to vary simultaneously the time of occurrence of said tracking pulse and the time of occurrence of said selected zero point with respect to a signal from said source.

References Cited in the file of this patent

UNITED STATES PATENTS

| | | |
|---|---|---|
| 2,414,323 | Moe | Jan. 14, 1947 |
| 2,416,088 | Deerhake | Feb. 18, 1947 |
| 2,416,591 | Muntz et al. | Feb. 25, 1947 |
| 2,418,127 | Labin | Apr. 1, 1947 |
| 2,422,204 | Meacham | June 17, 1947 |